(12) United States Patent
Félix et al.

(10) Patent No.: US 9,020,662 B2
(45) Date of Patent: Apr. 28, 2015

(54) PREDICTING AIRCRAFT TRAJECTORY

(75) Inventors: Francisco A. Navarro Félix, Madrid (ES); Miguel A. Vilaplana Ruiz, Madrid (ES); Carlos Querejeta, Madrid (ES); Eduardo Gallo, Madrid (ES); Javier López Leonés, Madrid (ES)

(73) Assignee: The Boeing Company, Chicago, IL (US)

( * ) Notice: Subject to any disclaimer, the term of this patent is extended or adjusted under 35 U.S.C. 154(b) by 841 days.

(21) Appl. No.: 12/679,275

(22) PCT Filed: Sep. 10, 2008

(86) PCT No.: PCT/US2008/075877
§ 371 (c)(1),
(2), (4) Date: Aug. 4, 2010

(87) PCT Pub. No.: WO2009/042405
PCT Pub. Date: Apr. 2, 2009

(65) Prior Publication Data
US 2010/0305781 A1    Dec. 2, 2010

(30) Foreign Application Priority Data

Sep. 21, 2007  (EP) .................................... 07380259

(51) Int. Cl.
*G05D 1/00* (2006.01)
*G08G 5/00* (2006.01)
(Continued)

(52) U.S. Cl.
CPC .............. *G08G 5/0065* (2013.01); *G05D 1/101* (2013.01); *G08G 5/0021* (2013.01); *G08G 5/0052* (2013.01); *G08G 5/025* (2013.01)

(58) Field of Classification Search
USPC ...................................................... 701/3, 301
See application file for complete search history.

(56) References Cited

U.S. PATENT DOCUMENTS 4,086,632 A    4/1978  Lions
5,057,835 A   10/1991  Factor et al.
(Continued)

FOREIGN PATENT DOCUMENTS

EP    1796060 A1    6/2007
EP    2040137 A1    3/2009
(Continued)

OTHER PUBLICATIONS

Vilaplana et al., "Towards a formal language for the common description of aircraft intent", 24th Digital Avionics Systems Conference, Oct. 30-Nov. 3, 2005, IEEE, 9 pages.*
(Continued)

*Primary Examiner* — Mary Cheung
*Assistant Examiner* — Yuen Wong
(74) *Attorney, Agent, or Firm* — Yee & Associates, P.C.

(57) ABSTRACT

The present invention provides a computer-implemented method of producing a description of aircraft intent expressed using a formal language. The description may be used to predict aircraft trajectory, for example by air traffic management. Rules are used in association with information provided to generate a set of instructions describing both the aerodynamic configuration of the aircraft and the motion of the aircraft. These instructions are checked to ensure that they describe unambiguously the aircraft's trajectory. The instructions are then expressed using a formal language.

20 Claims, 10 Drawing Sheets

(51) Int. Cl.
*G05D 1/10* (2006.01)
*G08G 5/02* (2006.01)

(56) References Cited

U.S. PATENT DOCUMENTS

| | | | |
|---|---|---|---|
| 5,398,186 | A | 3/1995 | Nakhla |
| 5,842,142 | A | 11/1998 | Murray et al. |
| 6,519,527 | B2 | 2/2003 | Shinagawa |
| 6,573,841 | B2 | 6/2003 | Price |
| 6,643,580 | B1 | 11/2003 | Naimer et al. |
| 6,804,585 | B2 | 10/2004 | Humbard et al. |
| 6,963,291 | B2 | 11/2005 | Holforty et al. |
| 7,689,328 | B2 | 3/2010 | Spinelli |
| 7,693,614 | B2 | 4/2010 | Turung |
| 7,874,521 | B2 | 1/2011 | Shuster |
| 2002/0140578 | A1 | 10/2002 | Price |
| 2003/0060940 | A1 | 3/2003 | Humbard et al. |
| 2005/0216138 | A1 | 9/2005 | Turung |
| 2007/0138345 | A1 | 6/2007 | Shuster |
| 2008/0154447 | A1 | 6/2008 | Spinelli |
| 2008/0221745 | A1 | 9/2008 | Diamandis et al. |
| 2010/0161156 | A1 | 6/2010 | Coulmeau et al. |
| 2011/0264312 | A1 | 10/2011 | Spinelli et al. |

FOREIGN PATENT DOCUMENTS

| | | | |
|---|---|---|---|
| WO | 2009042405 | A2 | 4/2009 |
| WO | 2011152917 | A2 | 12/2011 |

OTHER PUBLICATIONS

Gallo et al., "Advanced Aircraft Performance Modeling For ATM: BADA 4.0 Results", 25th Digital Avionics Systems Conference, Oct. 15, 2006, IEEE, 12 pages.*

European Search Report for Application No. EP07380259 dated May 26, 2008.

Gallo et al., "Advanced Aircraft Performance Modeling for ATM: BADA 4.0 Results", 25th Digital Avionics Systems Conference, Oct. 15, 2006, IEEE, pp. 1-12.

Vilaplana et al., "Towards a Formal Language for the Common Description of Aircraft Intent", 24th Digital Avionics Systems Conference, Washington, DC, USA, Oct. 30, 2005, IEEE, pp. 1-9.

Lopez Leones, "Definition of an Aircraft Intent Description Language for Air Traffic Management Applications," Thesis, University of Glasgow, Feb. 2008, 404 pages.

International Search Report, dated Sep. 15, 2010, regarding Application No. PCT/US2008/075877, 9 pages.

International Search Report, dated Nov. 21, 2011, regarding Application No. PCT/US2011/028795, 10 pages.

Offer et al., "Aircraft Emergency Landing Route System," U.S. Appl. No. 13/746,076, filed Jan. 22, 2013, 89 pages.

Office Action dated Jun. 22, 2012, regarding U.S. Appl. No. 12/764,797, 16 pages.

Final Office Action, dated Feb. 13, 2013, regarding U.S. Appl. No. 12/764,797, 13 pages.

Extended European Search Report, dated Feb. 4, 2013, regarding Application No. EP12382273.6, 8 pages.

Krozel, "Intent Inference for Free Flight Aircraft", AIAA Guidance, Navigation, and Control Conference and Exhibit, AIAA-00/4479, Aug. 2000, 11 pages.

Krozel et al., "Intent Inference with Path Prediction", Journal of Guidance, Control, and Dynamics, vol. 29, No. 2, Mar.-Apr. 2006, pp. 225-236.

Lovera Yepes et al, "New Algorithms for Aircraft Intent Inference and Trajectory Prediction", Journal of Guidance, Control, and Dynamics, vol. 30, No. 2, Mar.-Apr. 2007, pp. 370-382.

López Leonés, "REACT Project: Preliminary Set of Requirements for an AIDL", REACT Workshop, Jun. 2008, 29 pages.

Vilaplana, "Intent Synchronization", Eurocontrol/FAA Workshop on Avionics for 2011 and Beyond, Oct. 2005, 19 pages.

* cited by examiner

| TYPES | GROUP | | | INSTRUCTION | | |
|---|---|---|---|---|---|---|
| | N° | KEYWORD | NAME | N° | KEYWORD | NAME |
| MOTION INSTRUCTION | 1 | SG | SPEED GUIDANCE | 1 | SL | SPEED LAW |
| | | | | 2 | HS | HOLD SPEED |
| | 2 | HSG | HORIZONTAL SPEED GUIDANCE | 3 | HSL | HORIZONTAL SPEED LAW |
| | | | | 4 | HHS | HOLD HORIZONTAL SPEED |
| | 3 | VSG | VERTICAL SPEED GUIDANCE | 5 | VSL | VERTICAL SPEED LAW |
| | | | | 6 | HVS | HOLD VERTICAL SPEED |
| | 4 | PAG | PATH ANGLE GUIDANCE | 7 | SPA | SET PATH ANGLE |
| | | | | 8 | PAL | PATH ANGLE LAW |
| | | | | 9 | HPA | HOLD PATH ANGLE |
| | 5 | AG | ALTITUDE GUIDANCE | 10 | AL | ALTITUDE LAW |
| | | | | 11 | HA | HOLD ALTITUDE |
| | 6 | VPG | VERTICAL POSITIONAL GUIDANCE | 12 | TVP | TRACK VERTICAL PATH |
| | 7 | TC | THROTTLE CONTROL | 13 | ST | SET THROTTLE |
| | | | | 14 | TL | THROTTLE LAW |
| | | | | 15 | HT | HOLD THROTTLE |
| | | | | 16 | OLT | OPEN LOOP THROTTLE |
| | 8 | LDC | LATERAL DIRECTIONAL CONTROL | 19 | SBA | SET BANK ANGLE |
| | | | | 20 | BAL | BANK ANGLE LAW |
| | | | | 21 | HBA | HOLD BANK ANGLE |
| | | | | 22 | OLBA | OPEN LOOP BANK ANGLE |
| | 9 | DG | DIRECTIONAL GUIDANCE | 17 | CL | COURSE LAW |
| | | | | 18 | HC | HOLD COURSE |
| | 10 | LPG | LATERAL POSITIONAL GUIDANCE | 23 | THP | TRACK HORIZONAL PATH |
| CONFIGURATION INSTRUCTIONS | 11 | HLC | HIGH LIFT CONFIGURATION | 24 | SHL | SET HIGH LIFT DEVICES |
| | | | | 25 | HLL | HIGH LIFT DEVICES LAW |
| | | | | 26 | HHL | HOLD HIGH LIFT DEVICES |
| | 12 | SBC | SPEED BRAKES CONFIGURATION | 27 | SSB | SET SPEED BRAKES |
| | | | | 28 | SBL | SPEED BRAKES LAW |
| | | | | 29 | HSB | HOLD SPEED BRAKES |
| | | | | 30 | OLSB | OPEN LOOP SPEED BRAKES |
| | 13 | LGC | LANDING GEAR CONFIGURATION | 31 | SLG | SET LANDING GEAR |
| | | | | 32 | HLG | HOLD LANDING GEAR |

| LEGEND | | |
|---|---|---|
| BOUNDARY CONDITIONS | | |
| ▶ | FIXED | |
| ▽ | FLOATING | |
| ⟨A⟩ | AUTO | |
| ⌐ | LINKED | |
| r | TURN RADIUS | |

| | | INSTRUCTIONS |
|---|---|---|
| | HLC | HOLD HIGH LIFT DEVICES UNTIL AUTO RETRACT FLAPS THEN HOLD HIGH LIFT DEVICES IN CLEAN CONFIGURATION. |
| | LGC | SET LANDING GEAR UP. |
| | SBC | HOLD SPEED BRAKE DOWN. |
| | 1ST DOF | MAXIMUM VERTICAL SPEED LAW UNTIL REACHING ALTITUDE (h=2400FT), THEN HOLD SPEED (CAS) UNTIL REACHING ALTITUDE (h=3500FT), THEN HOLD ALTITUDE KCAS=240, THEN HOLD SPEED UNTIL REACHING ALTITUDE (h=4800FT), THEN CONTINUE CLIMB WITH AN OPTIMAL SPEED LAW WITH AN OPTIMIZATION CRITERIA (OC) OF MINIMUM COST. |
| | 2ND DOF | THROTTLE LAW WITH A MAXIMUM TAKE OFF ENGINE RATING (MTOF) UNTIL KCAS=240, THEN SET THROTTLE TO AN ENGINE RATING OF MAXIMUM CLIMB (MCMB) THEN HOLD IT. |
| | 3RD DOF | HOLD COURSE (RDL-003 BRA), TRACK HORIZONTAL PATH (CIRCULAR ARC) WITH RADIUS r UNTIL INTERSECTING RDL-278 VJZ AND HOLD COURSE (BEARING). TRACK HORIZONTAL PATH (CIRCULAR ARC) WITH RADIUS r UN CTING RDL-013 TLD, THEN TRACK HORIZONTAL PATH (GREAT CIRCLE) TOWARD VOR/DME TLD. |
| 3 | | |

Fig. 6C

PREDICTING AIRCRAFT TRAJECTORY

FIELD OF THE INVENTION

The present invention relates to predicting the path of an aircraft, for example during air traffic management. In particular, the present invention resides in a method of predicting the trajectory of an aircraft using aircraft intent expressed using a formal language.

This application is related to and claims the benefit of priority of European Application No. 07380259.7 entitled "PREDICTING AIRCRAFT TRAJECTORY," filed on Sep. 21, 2007, which is herein incorporated by reference.

BACKGROUND TO THE INVENTION

The ability to predict an aircraft's trajectory is useful for several reasons.

Air traffic management (ATM) would benefit from an improved ability to predict an aircraft's trajectory. Air traffic management is responsible for the safe separation of aircraft, a particularly demanding task in congested airspace such as around airports. ATM decision-support tools based on accurate trajectory predictions could allow a greater volume of aircraft to be handled while maintaining safety. By trajectory, a four-dimensional description of the aircraft's path is meant. The description may be the evolution of the aircraft's state with time, where the state may include the position of the aircraft's centre of mass and other aspects of its motion such as velocity, attitude and weight. This benefit is particularly significant where ATM is operating in and around airports. As demand for slots at airports increases, ATM is under constant pressure to increase capacity by decreasing separation between aircraft: increased accuracy in predicting aircraft trajectories enables this to be done without compromising safety. Also, greater predictability in aircraft trajectories allows arrival times to be determined more accurately thereby enabling better coordination with ground operations.

In current ATM practice, aircraft must typically fly set routes. For example, when approaching and departing an airport, aircraft are usually requested to fly a STAR (Standard Terminal Arrival Route) and a SID (Standard Instrument Departure), respectively. However, aircraft operators are requesting additional flexibility to fly according to their preferences, so that they can better pursue their business objectives. Furthermore, there is an increasing pressure on the ATM system to facilitate the reduction of the environmental impact of aircraft operations. As a result of the above, the ATM system requires the capability to predict operator-preferred trajectories as well as trajectories that minimize the impact on the environment, chiefly in terms of noise and emissions. In addition, the ATM system must be able to exchange descriptions of such trajectories with the operators in order to arrive at a coordinated, conflict-free solution to the traffic problem.

The ability to predict an aircraft's trajectory will also be of benefit to the management of autonomous vehicles such as unmanned air vehicles (UAVs), for example in programming flight plans for UAVs as well as in commanding and de-conflicting their trajectories.

In order to predict aircraft trajectory unambiguously, one must solve a set of differential equations that model both aircraft behaviour and atmospheric conditions. The computation process requires inputs corresponding to the aircraft intent.

Aircraft intent must be distinguished from flight intent. Flight intent may be thought of as a generalisation of the concept of a flight plan, and so will reflect operational requirements such as intended route and operator preferences. Generally, flight intent will not unambiguously define an aircraft's trajectory. Put another way, there are likely to be many aircraft trajectories that would satisfy a given flight intent. Thus, flight intent may be regarded as a basic blueprint in which the specific details required to compute unambiguously a trajectory are missing.

For example, the instructions to be followed during a STAR or a SID would correspond to an example of flight intent. In addition, airline preferences may also form an example of flight intent. To determine aircraft intent, instances of flight intent like a SID procedure, the airline's operational preferences and the actual pilot's decision making process must be combined. This is because aircraft intent comprises a structured set of instructions that are used by a trajectory computation infrastructure to provide an unambiguous trajectory. The instructions should include configuration details of the aircraft (e.g. landing gear deployment), and procedures to be followed during manoeuvres and normal flight (e.g. track a certain turn radius or hold a given airspeed). These instructions capture the basic commands and guidance modes at the disposal of the pilot and the aircraft's flight management system to direct the operation of the aircraft. Thus, aircraft intent may be thought of as an abstraction of the way in which an aircraft is commanded to behave by the pilot and/or flight management system. Of course, the pilot's decision making process is influenced by required procedures, for example as required to follow a STAR/SID or to comply with airline operational procedures.

Aircraft intent is expressed using a set of parameters presented so as to allow equations of motion to be solved. The theory of formal languages may be used to implement this formulation: an aircraft intent description language provides the set of instructions and the rules that govern the allowable combinations that express the aircraft intent, and so allow a prediction of the aircraft trajectory.

FIG. 1 shows a common infrastructure used in such aircraft trajectory computation, namely a trajectory computation infrastructure or TCI. The computation is executed by a trajectory engine. The trajectory engine requires as inputs both the aircraft intent description described above and also the initial state of the aircraft. The trajectory engine provides as an output a description of the computed trajectory for the aircraft. To produce such an output, the trajectory engine uses two models: an aircraft performance model and an Earth model.

The aircraft performance model provides the values of the aircraft performance aspects required by the trajectory engine to integrate the equations of motion. These values depend on the aircraft type for which the trajectory is being computed, the aircraft's current motion state (position, velocity, weight, etc) and the current local atmospheric conditions. In addition, the performance values may depend on the intended operation of the aircraft, i.e. on the aircraft intent. For example, a trajectory engine may use the aircraft performance model to provide a value of the instantaneous rate of descent corresponding to a certain aircraft weight, atmospheric conditions (pressure altitude and temperature) and intended speed schedule (e.g. constant calibrated airspeed). The trajectory engine will also request from the aircraft performance model the values of the applicable limitations so as to ensure that the aircraft motion remains within the flight envelope. The aircraft performance model is also responsible for providing the TE with other performance-related aspects that are intrinsic to the aircraft, such as flap and landing gear deployment times.

The Earth model provides information relating to environmental conditions, such as the state of the atmosphere, weather conditions, gravity and magnetic variation.

The trajectory engine uses the inputs, the aircraft performance model and the Earth model to solve a set of equations of motion. Many different sets of equations of motion are available that vary in complexity, and that may reduce the aircraft's motion to fewer degrees of freedom by means of a certain set of simplifying assumptions.

The trajectory computation infrastructure may be air-based or land-based. For example, the trajectory computation infrastructure may be associated with an aircraft's flight management system that controls the aircraft on the basis of a predicted trajectory that captures the airline operating preferences and business objectives. The primary role for land-based trajectory computation infrastructures is for air traffic management.

For land-based systems, the output of the trajectory engine (i.e. the description of the computed trajectory) is provided to an application that provides a service to a particular ATM body or organisation. However, many different such applications exist, with each ATM application using its own trajectory modelling. To date, there has been little, if any, commonality between these applications. Given the anticipated growth in the number and sophistication of such trajectory-based ATM applications, this lack of commonality is a serious issue since, for safety reasons: different applications dealing with the same flight must hold consistent predictions for the trajectory of that flight.

In addition, the accuracy of these applications has been limited. This situation may be attributed to several factors including scarce availability of aircraft performance data, limited computing power, less stringent requirements for accuracy and lack of coordination initiatives.

There is also a need to ensure that the trajectories predicted by ground-based ATM tools can be synchronized with those predicted by an aircraft's flight management system. As noted above, the aircraft's flight management system controls the aircraft on the basis of a predicted trajectory that captures the airline operating preferences and business objectives. The amendments to this reference business trajectory coming from the ground must be made in a way that is consistent with the flight management system's trajectory modelling methodology to ensure that air and ground systems operate in a coordinated manner.

SUMMARY OF THE INVENTION

Against this background and from a first aspect, the present invention resides in a computer-implemented method of providing a description of aircraft intent expressed using a formal language, the method comprising: receiving information defining how the aircraft is to be flown during a time interval, and storing the information in an information database; deriving from the information stored a set of instructions, wherein the set of instructions comprise configuration instructions that describe the aerodynamic configuration of the aircraft and motion instructions that describe the motion of the aircraft; ensuring that the set of instructions comply with a set of rules stored in a rules database thereby confirming that the configuration instructions define the aerodynamic configuration of the aircraft as required and that the motion instructions close the degrees of freedom of equations of motion used to describe the aircraft motion during the time interval; and expressing the set of instructions using a formal language.

The present invention addresses a need for increased commonality between ATM applications, both ground-based and airborne, along with that for increased accuracy in aircraft trajectory prediction.

The present invention provides a formal and rigorous framework that enables modelling, expressing and exchanging aircraft intent information in an unambiguous manner. This framework may support a computer-implemented method to extract aircraft intent information from an application relying on a trajectory computation infrastructure (including both ground-based ATM applications and flight management systems) and express it in a common format, i.e. an aircraft intent description language, that compatible with other applications.

Such a capability will permit ATM applications using different trajectory modelling approaches to synchronize the aircraft intent input to their respective trajectory computation infrastructures.

In addition, the availability of a common method to describe aircraft intent information may be exploited in other domains involving predicted trajectories of air vehicles, such as the management of UAVs and PAVs (Personal Air Vehicles).

Other aspects of the invention, along with preferred features, are set out in the appended claims.

BRIEF DESCRIPTION OF THE DRAWING

In order that the present invention may be more readily understood, preferred embodiments will now be described, by way of example only, with reference to the accompanying drawings in which:

FIG. 2B is a table showing classification of instructions;

FIG. 6 shows a relationship between FIG. 6A, FIG. 6B, and FIG. 6C;

FIG. 6C is a diagram showing an example of aircraft intent for one of the SIDs shown in FIGS. 5A and 5B.

DETAILED DESCRIPTION OF THE INVENTION

Figure 1:
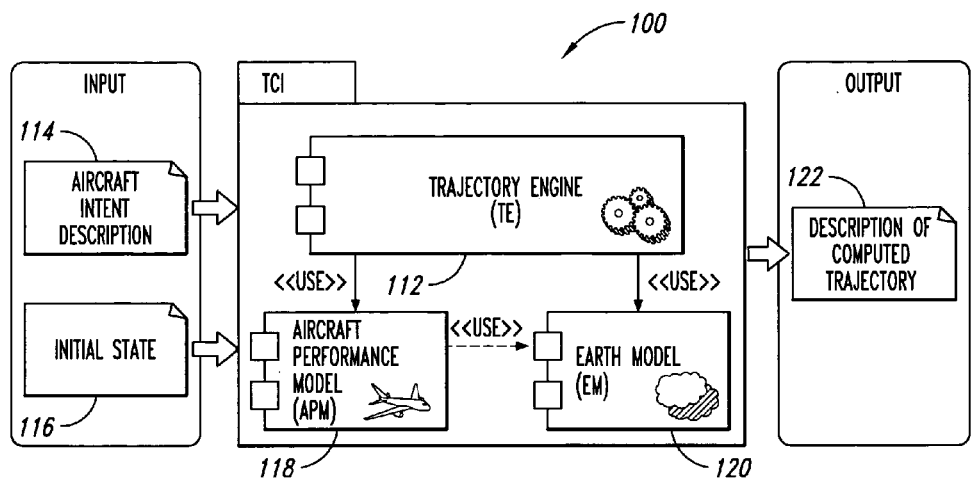
FIG. 1 is a representation of a trajectory computation infrastructure.

A trajectory computation infrastructure 100 is shown in FIG. 1, and this infrastructure has been described above. In summary, a trajectory engine 112 takes as inputs an aircraft intent description 114 and a description of the initial state 116 of the aircraft, and uses an aircraft performance model 118 and an Earth model 120 to provide a description of the computed trajectory 122 as an output. The trajectory computation infrastructure may be air-based or land-based.

Figure 2A:
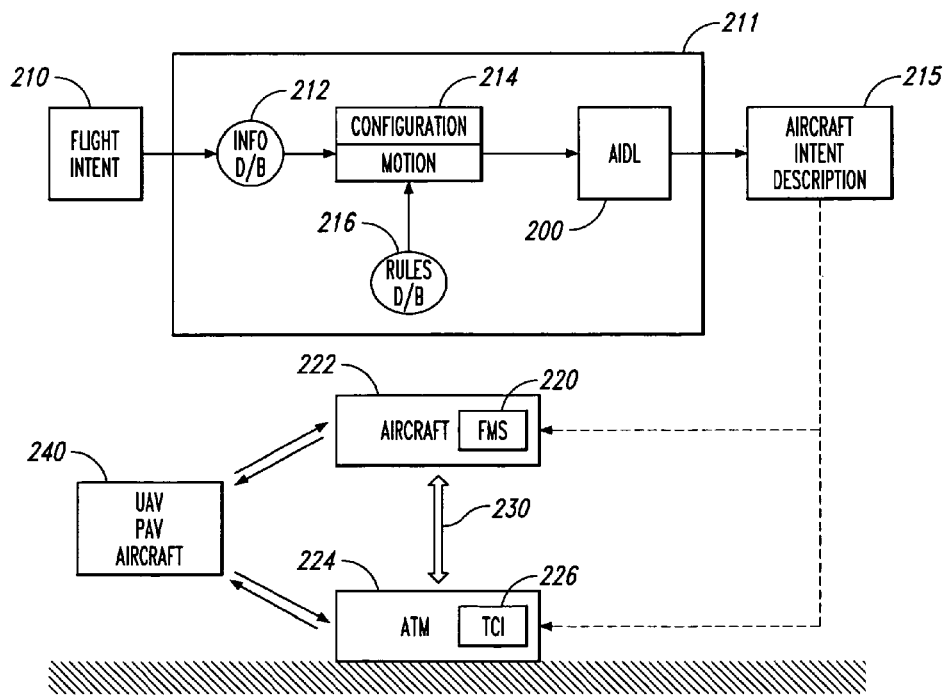
FIG. 2A is a diagram generally representing a preferred embodiment.

A preferred embodiment is shown in FIG. 2A that shows a computer-implemented 211 method of providing a description of aircraft intent expressed using a formal language 200, the method comprising: receiving information 210 defining how an aircraft 222 is to be flown during a time interval, and storing the information in an information database 212; deriving from the information stored a set of instructions 214, wherein the set of instructions comprise configuration instructions that describe the aerodynamic configuration of the aircraft and motion instructions that describe the motion of the aircraft; ensuring that the set of instructions comply with a set of rules stored in a rules database 216 thereby confirming that the configuration instructions define the aerodynamic configuration of the aircraft as required and that the motion instructions close the degrees of freedom of equations of motion used to describe the aircraft motion during the time interval; and expressing the set of instructions using the formal language 200.

The present invention makes use of the method of providing aircraft intent description 215 as an expression of a set of instructions 214 in a formal language (an aircraft intent description language 200), thereby defining unambiguously an operation. This expression is used by the trajectory computation engine to solve the equations of motion. There exists in the art many different sets of equations of motion that describe an aircraft's motion. The sets of equations generally differ due to their complexity. In principle, any of these sets of equations may be used. The actual form of the equations of motion influences how the aircraft intent description language should be formulated because variables that appear in the equations of motion also appear in the instructions defining the aircraft intent. Hence, there follows a discussion of the set of equations of motion employed to derive the main components of the proposed aircraft intent description language.

Equations of Motion

In this example, the set of equations of motion adopted to define the aircraft intent description language 200 describes the motion of the aircraft's centre of gravity, with the aircraft considered as a mass-varying rigid solid. Three coordinates describe the position of the aircraft's centre of mass (longitude, latitude and altitude) and three values describe the aircraft's attitude (roll, pitch and yaw). To derive the equations, a set of simplifying assumptions have been applied to the general equations describing atmospheric, powered flight. The resulting equations, shown below, are considered to provide sufficient modelling fidelity to describe the evolution of the aspects of the state of an aircraft that are relevant to the study of trajectories. In particular, the focus has been placed on describing symmetric flight of fixed-wing aircraft.

Dynamics:

$$\frac{dv_{TAS}}{dt} = \frac{T - D - W\sin\gamma_{TAS}}{m} - \dot{w}_1^{WFS}$$

$$\frac{d\gamma_{TAS}}{dt} = \frac{1}{v_{TAS}}\left[\frac{L\cos\mu_{TAS} - W\cdot\cos\gamma_{TAS}}{m} + (\dot{w}_3^{WFS}\cos\mu_{TAS} + \dot{w}_2^{WFS}\sin\mu_{TAS})\right]$$

$$\frac{d\chi_{TAS}}{dt} = \frac{1}{v_{TAS}\cos\gamma_{TAS}}\left[\frac{L\sin\mu_{TAS}}{m} + (\dot{w}_3^{WFS}\sin\mu_{TAS} - \dot{w}_2^{WFS}\cos\mu_{TAS})\right]$$

Mass Variation:

$$\frac{dm}{dt} + F = 0$$

Navigation:

$$\frac{d\lambda}{dt} = \frac{1}{(N+h)\cos\varphi}(v_{TAS}\cos\gamma_{TAS}\sin\chi_{TAS} + w_2)$$

$$\frac{d\varphi}{dt} = \frac{1}{M+h}(v_{TAS}\cos\gamma_{TAS}\cos\chi_{TAS} + w_1)$$

$$\frac{dh}{dt} = v_{TAS}\sin\gamma_{TAS}$$

where:
T, D, L, W are thrust, drag, lift and weight;
F is fuel consumption;
$v_{TAS}$, $\gamma_{TAS}$, $\chi_{TAS}$, $\mu_{TAS}$ are true airspeed and its associated aerodynamic path, yaw and bank angles;
m is aircraft mass;
$\lambda$, $\phi$, h are centre of gravity coordinates in geodetic reference system;
M, N are the meridian and prime vertical radius of curvature respectively;
w is the wind velocity vector; and
$\dot{w}_1^{WFS}$, $\dot{w}_2^{WFS}$, $\dot{w}_3^{WFS}$ are the wind derivatives with time projected in the wind fixed system.

The trajectory computation engine 112 solves these equations with reference to the airplane performance model 118 and the Earth model 120. These models provide relationships of variables necessary if the equations are to be integrated successfully. Examples of dependencies are provided below:

Aircraft Performance Model:

$$D = f(v_{TAS}, \delta, \theta, C_D)$$

$$T = W_{MTOW}\delta C_T$$

$$F = W_{MTOW}a_0\delta\sqrt{\theta}C_F/L_{HV}$$

$$W = mg$$

$$C_D = f(C_L, v_{TAS}, \theta, \delta_{LG}, \delta_{HL}, \delta_{SB})$$

$$C_L = f(v_{TAS}, \delta, \theta, L, \delta_{LG}, \delta_{HL}, \delta_{SB})$$

$$C_T = f(M, \delta_T)$$

$$C_F = f(M, \delta_T)$$

Earth Model:

wind $w = f(\lambda, \phi, h, t)$ temperature $\theta = f(\lambda, \phi, h, t)$ pressure $= \delta = f(\lambda, \phi, h, t)$ gravity $g = f(\lambda, \phi, h)$ magnetic variation $V = f(\lambda, \phi, h)$ where the newly introduced symbols are:
$C_D$, $C_L$, $C_T$, $C_F$ are coefficients of drag, lift, thrust and fuel consumption respectively;
$W_{MTOW}$ is the maximum take-off weight;
$L_{HV}$ is the fuel lower heating value.
$\theta$, $\delta$ are the local atmospheric temperature and pressure ratios respectively;
$a_0$ is the standard speed of sound at mean sea level;
g is the local gravitational acceleration; and
$\delta_{LG}$, $\delta_{HL}$, $\delta_{SB}$, $\delta_T$ are the landing gear, high-lift devices, speed brakes and thrust settings.

For a given aircraft configuration (landing gear, high-lift devices and speed brakes settings), the above equations of motion form a system of seven non-linear ordinary differential equations that have:

(1) one independent variable t;
(2) ten dependent variables $v_{TAS}$, $\gamma_{TAS}$, $\chi_{TAS}$, $\mu_{TAS}$, $\lambda$, $\phi$, h, m, L, $\delta_T$; and
(3) three mathematical degrees of freedom (i.e. the number of dependent variables minus the number of equations).

Thus, choice of the equations of motion above means that it is necessary to define externally the three degrees of freedom to obtain a closed solution thereby defining the aircraft trajectory unambiguously.

When the equations of motion are solved in conjunction with the aircraft performance model and Earth model, the resulting system of equations has six degrees of freedom: the three mathematical degrees of freedom of the equations of motion described above plus three degrees of freedom coming from the aircraft configuration (the landing gear, speed brakes and high-lift devices inputs must be closed at any time to obtain the trajectory).

The dependent variables may be divided into two groups:
control variables: $\mu_{TAS}$, L, $\delta_T$
state variables: $v_{TAS}$, $\gamma_{TAS}$, $\chi_{TAS}$, $\lambda$, $\phi$, h, m In theory, the equations of motion may be closed by using the instructions in the aircraft intent description to define a time evolution of the three control variables. However, such an approach loses the connection with how the aircraft is operated. Thus, a requirement is to structure the instructions in such a way as to close the three degrees of freedom.

The following description of the instructions that form the aircraft intent description language is more easily followed by expressing the above equations in a more compact form using state-space form. This form highlights the functional dependencies among the variables. The space-state form of a dynamic system has the following general vector form:

$$\dot{X} = f(X, u, t)$$

where $X = (X_1, \ldots, X_n)$ is the state vector which contains state variables, and where $u = (u_1, \ldots, u_m)$ contains the control variables. Consequently, we can write:

$$\dot{X}_i = f_i(X_1, \ldots, X_n, u_1, \ldots, u_m, t)$$

to $$\dot{X}_n = f_n(X_1, \ldots, X_n, u_1, \ldots, u_m, t)$$

where the functions $f_i$ are sufficiently smooth non-linear functions. Applying this model to the present context allows the above equations to be expressed as:

$$\dot{v}_{TAS} = f(v_{TAS}, \gamma_{TAS}, \chi_{TAS}, \delta_T, L, \delta_{LG}, \delta_{HL}, \delta_{SB}, \delta, \theta, g, w, t)$$

$$\dot{\gamma}_{TAS} = f(v_{TAS}, \gamma_{TAS}, \chi_{TAS}, \mu_{TAS}, L, \delta_{LG}, \delta_{HL}, \delta_{SB}, \delta, \theta, g, w, t)$$

$$\dot{\chi}_{TAS} = f(v_{TAS}, \gamma_{TAS}, \chi_{TAS}, \mu_{TAS}, L, \delta_{LG}, \delta_{HL}, \delta_{SB}, \delta, \theta, w, t)$$

$$\dot{\lambda} = f(v_{TAS}, \gamma_{TAS}, \chi_{TAS}, \lambda, \phi, h, w, t)$$

$$\dot{\phi} = f(v_{TAS}, \gamma_{TAS}, \chi_{TAS}, \lambda, \phi, h, w, t)$$

$$\dot{h} = f(v_{TAS}, \gamma_{TAS}, \lambda, \phi, h, w, t)$$

$$\dot{m} = f(v_{TAS}, \delta_T, \delta\theta, t)$$

The variables $\delta$, $\theta$, g, w are contained in the Earth model vector E, where $E = [\delta\ \theta\ V\ g\ w]$. In general, the components of this vector will depend on the aircraft position and time so that we can write $$E = E(X, t) = f(\lambda, \phi, h, t).$$

The configuration parameters $\delta_{HL}$, $\delta_{LG}$, $\delta_{SB}$ are grouped into the configuration vector $\Delta = [\delta_{HL}\ \delta_{LG}\ \delta_{SB}]$ which is a function of time.

Considering the above, we can define:
the state vector to be $X = [v_{TAS}\ \gamma_{TAS}\ \chi_{TAS}\ \lambda\ \phi\ h\ m]$; and
the control vector to be $u = [\mu_{TAS}\ L\ \delta_T]$; and write the equations of motion in space-state form as $$\dot{X} = f(X, u, E(X,t), \Delta, t) = f(X, u, \Delta, t).$$

For simplicity, the lift L may be omitted such that the control vector becomes $u = [\mu_{TAS}\ \delta_T]$.

Aircraft Intent Description Language

Now that the equations of motion have been introduced, it is appropriate to describe the aircraft intent description language 200 in more detail. The aircraft intent description language is a formal language. The primitives of the formal language are the instructions, and the grammar provides the framework that allows instructions to be combined into sentences that describe operations. Each operation contains a complete set of instructions that close the required three degrees of freedom in the equations of motion and so unambiguously defines the aircraft trajectory over its associated operation interval. In addition, the aircraft configuration must also be specified for that operation interval by means of the appropriate instructions.

Instructions may be thought of as indivisible pieces of information that capture basic commands, guidance modes and control inputs at the disposal of the pilot and/or the flight management system. Each instruction may be characterised by three main features.

The effect of an instruction is defined by a mathematical description of its influence on the aircraft's motion. It is expressed as a mathematical equation that must be fulfilled along with the equations of motion during its execution interval. The effect of some instructions may be parametric, as it may be necessary to specify one or more parameters associated with the instruction to characterize fully how it affects the aircraft motion. For example, to define the evolution of the flight path angle to a certain target value, it is necessary to specify that value or to provide the means to retrieve it.

The meaning of an instruction is given by its intrinsic purpose and is related to the operational purpose of the command, guidance mode or control input captured by the instruction.

The execution interval is the period during which the instruction is affecting the aircraft's motion, i.e. the time during which the equations of motion and the instruction's effect must be simultaneously satisfied. The execution of different instructions may overlap, and such instructions are said to be compatible. Other instructions are incompatible, and so cannot have overlapping execution intervals (e.g. instructions that cause a conflicting requirement for the aircraft to ascend and descend).

The instructions are divided into groups, with the division primarily focussing on the effect of the instructions, and then on grouping incompatible instructions together, as shown in FIG. 23. At a top level, the instructions are divided into two groups: configuration instructions 270 and motion instructions 260.

Configuration Instructions

Configuration instructions 270 relate to the aircraft's instantaneous aerodynamic configuration as determined by the high-lift devices, landing gear and speed brakes. The effect of any member of this group is the time evolution of the position of the associated components.

The first group is called high lift configuration or HLC, and comprises the instructions set high-lift devices (SHL), high-lift devices law (HLL) and hold high-lift devices (HHL).

The second group is called speed brakes configuration or SBC, and comprises the instructions set speed brakes (SSB), speed brakes law (SBL), open loop speed brakes (OLSB) and hold speed brakes (HSB).

The third group is called landing gear configuration or LGC, and comprises the instructions set landing gear (SLG) and hold landing gear (HLG).

As the configuration of the aircraft must be fully determined at all times, there must always be an active instruction from each of these groups. However, these instructions do not close any of the mathematical degrees of freedom of the aircraft's motion as described by the equations of motion. This is because, while these instructions influence the aerodynamic actions on the aircraft, they do not alter the mechanics of the aircrafts response to those actions or the ways in which the aircraft may be controlled.

Motion Instructions

Motion instructions 260 capture the flight control commands, guidance modes and navigation strategies that may be employed. The effect of a motion instruction is defined as a mathematical equation that unambiguously determines one of the degrees of freedom during the execution interval of the instruction. As such, the mathematical equation will be a function of at most one of the control variables defined above. At any one instant, three motion instructions must be active to close the three degrees of freedom. In space state form, the effect of a motion instruction is expressed as $f(X, u_i, E, t)=0$ where $u_i$ is the control variable and so a component of the control vector u.

Over any time interval, the aircraft motion will be the result of integrating the equations of motion and the equations describing the effect of the three active motion instruction. Thus the equations to be solved for a given aerodynamic configuration have the following form:

$$\dot{X}=f[X,u,E(X,t),t]$$

$$f[X,u_i,E(X,t),t]=0$$

$$f[X,u_j,E(X,t),t]=0$$

$$f[X,u_k,E(X,t),t]=0$$

With an appropriate set of initial or boundary conditions, this system would respectively represent an initial value problem or a boundary value problem whose unique solution is the aircraft motion over the execution interval.

Four types of motion instructions are defined depending upon the form of their effect function f.

Open loop inputs do not have state variables as explicit arguments and their effect may be written as an explicit function of time defining the input: $u_i=f(t)$.

Control laws have an equation that may be written as an explicit control governing the input: $u_i=f[X, E(X, t), t]$.

Guidance laws have an equation that may be written as an outer loop guidance law that governs one of the state variables $X_j=f[X_1, \ldots, X_{j-1}, X_{j+1}, E(X, t), t]$.

Generalized constraints have an equation where several input variables appear as explicit arguments: $f[X, E(X, t), t]=0$. In these instructions, more than one state variable are controlled simultaneously.

The motion instructions are classified into ten groups according to their effect, each group containing incompatible instructions as follows.

1. Group SG—speed guidance.
    Contains speed law (SL) and hold speed (HS), these both being guidance laws.
2. Group HSG—horizontal speed guidance.
    Contains horizontal speed law (HSL) and hold horizontal speed (HHS), both being generalised constraints.
3. Group VSG—vertical speed guidance.
    Contains vertical speed law (VSL) and hold vertical speed (HVS), these being generalised constraints.
4. Group PAG—path angle guidance.
    Contains set path angle (SPA), path angle law (PAL) and hold path angle (HPA), all guidance laws.
5. Group LAG—local altitude guidance.
    Contains altitude law (AL) and hold altitude (HA), both guidance laws.
6. Group VPG—vertical positional guidance.
    Contains track vertical path (TVP), a generalised constraint.
7. Group TC—throttle control.
    Contains set throttle (ST), throttle law (TL), hold throttle (HT) and open loop throttle (OLT), with the first three being control laws and the last one an open loop input instruction.
8. Group LDC—lateral directional control.
    Contains set bank angle (SBA), bank angle law (BAL), hold bank angle (HBA) and open loop bank angle (OLBA), with the first three being control laws and the last one an open loop input instruction.
9. Group PG—directional guidance.
    Contains course law (CL) and hold course (HC), both being guidance laws.
10. Group LPG—lateral positional guidance.
    Contains track horizontal path (THP), a generalised constraint.

The information received relating to the aircraft intent (i.e. flight intent, operator preferences, pilot selections, flying procedures, etc.) may be mapped to the instructions in the groups above. For example, a manual input throttle control will map to the TC group. Similarly, a pilot may select a climb-out procedure that contains both speed and flight path angle, thus mapping to the VSG and PAG groups, along with a bearing to maintain that will map to the LPG group.

Rules for Combining Instructions

As will be evident from the description above, an operation requires at least six instructions to be active simultaneously throughout the operation interval if the aircraft's trajectory is to be predicted unambiguously. Configuration instructions account for three: an instruction must come from each group to provide a complete description the aircraft's configuration. In order to close the three degrees of freedom of the equations of motion, three motion instructions are required: rules for selection of these three instructions are required to ensure that the three degrees are closed (i.e. to avoid complementary instructions that serve to close only a single degree of freedom).

Seven rules govern the possible combinations of instructions, as follows. The rules are based on mathematical incompatibilities between the instructions' effects that result in the problem of motion not having a unique solution. An indication of the reason behind the rule is also provided below.

1. An operation must have six instructions (follows from 3 and 4 below).
2. Each instruction must come from a different group as members of the same group are incompatible).
3. One instruction must come from each of HLC, LGC and SBC (i.e. the configuration instruction groups, to define the configuration of the aircraft).

4. Three instructions must come from the following groups: DG, LPG, LDC, TC, SG, HSG, VSG, PAG, AG and VPG. (i.e. the motion instruction groups to close the three degrees of freedom).
5. One and only one instruction must come from DG, LPG and LDC (to avoid conflicting requirements for lateral motion).
6. Instructions from groups SG and HSG cannot be present simultaneously (to avoid conflicting requirements for speed).
7. Instructions from groups VSG, PAG, AG and VPG cannot be present simultaneously (to avoid conflicting requirements for vertical speed, path angle and altitude).

The above lexical rules capture any unique solutions that may exist to the mathematical problem that results from combining the equations of motion with the effects of the active instructions. Thus, the lexical rules capture all the possible ways of unambiguously defining the aircraft trajectory prior to computing the trajectory. These rules ensure that, independently of the form of the function that describes mathematically the effect of the instruction, the mathematical problem is well posed for any possible set of initial conditions that the aircraft may have. Consequently, an instance of aircraft intent that complies with the above rules contains sufficient necessary information to compute a unique aircraft trajectory (besides performance and environmental information). In principle, any aircraft intent description that describes a unique, unambiguous trajectory can be translated into the proposed aircraft intent description language.

Instruction Triggers

Figure 3:
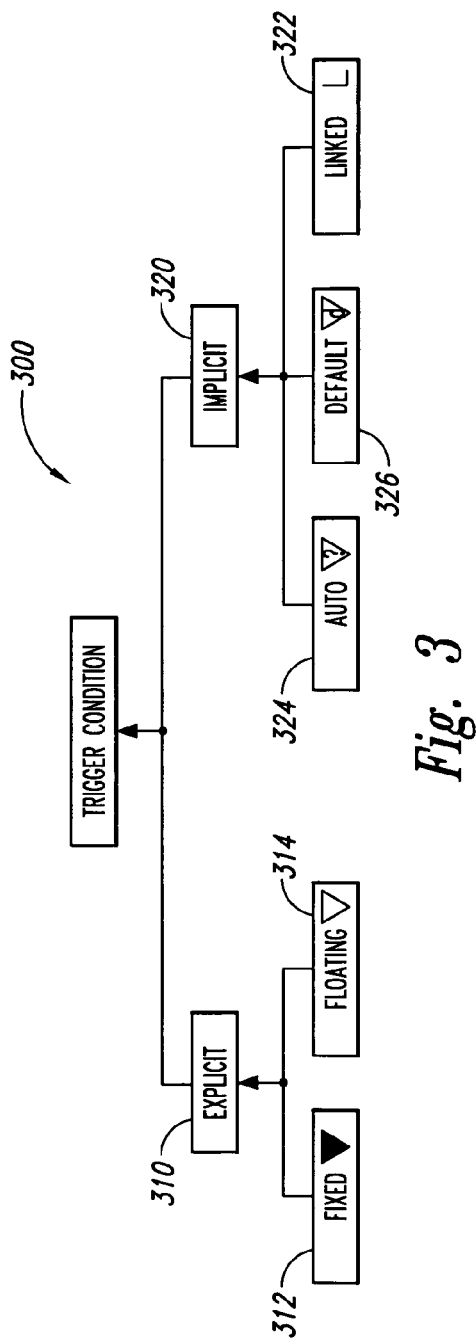
FIG. 3 is a diagram showing the different types of trigger conditions.

As noted above, each instruction has an associated instruction interval. A pair of triggers 300 control the start and finish of each instruction interval. These triggers may take different forms, as indicated in FIG. 3. Explicit triggers 310 are divided into fixed 312 and floating 314 triggers. Implicit triggers 320 are divided into linked 322, auto 324 and default 326 triggers.

Starting with the explicit triggers, a fixed trigger refers to a specified time instant for starting or ending an execution interval. For example, a pilot's decision to extend an aircraft's high lift devices at a particular time would be modelled as a set high lift devices instruction whose initial trigger condition would be fixed.

A boating trigger depends upon an aircraft state variable such as speed or altitude reaching a certain value to cause an execution interval to start or end. Similarly, the trigger may be prompted by a mathematical combination of state variables meeting a certain condition. An example would be a set throttle to a specific engine regime that would be invoked upon a certain speed being reached.

Turning now to implicit triggers, a linked trigger is specified in another instruction. In this way, a series of triggers may create a logically ordered sequence of instructions where the chain of start triggers is dependent upon the end trigger of the previous instruction. As such, a linked trigger points to an instruction rather than to a condition. Following on from the previous example of a set throttle to a certain regime triggered when a speed is reached, the subsequent instruction may be a hold throttle to the engine regime achieved and a linked trigger would start this instruction.

Auto triggers delegate responsibility for determining whether the conditions have been met to the trajectory computation engine using the aircraft intent description 215. Such an arrangement is needed when the conditions are not known at the intent generation time, and will only become apparent at the trajectory computation time. An example is an aircraft tracking a VOR radial whose intent is to perform a fly-by at a constant bank angle so as to intercept another VOR radial. At the time of intent generation, there is no information on when to begin the turn. Instead, this will be computed by the trajectory computation engine (most likely by iterating on different solutions to the problem). Hence the instruction set bank angle would have an auto trigger.

Default triggers represent conditions that are not known at intent generation, but are determined at trajectory computation because they rely upon reference to the aircraft performance model. The above example of a set bank angle instruction had an auto start trigger, and will have a default end trigger that will be determined by the law that defines the time evolution of the aircraft's bank angle provided by the aircraft performance model.

Instruction Parameters

As was previously mentioned, instructions can be parametric, i.e. it is necessary to specify one or more parameters associated to that instruction to characterize fully how it affects the aircraft motion.

These parameters 400 can be associated either with the effect or the triggers of an instruction. For example, to define the effect of a set bank angle instruction, the target value for the bank angle has to be defined. That value may be provided explicitly, e.g. set the bank to 10°, or could be obtained from the aircraft performance model (a default nominal bank angle as a function of the course change may be defined for each aircraft type). More complex parameters could be required to define the effect of a track horizontal path instruction. The effect of such instruction could be given by a great circle between two geodetic points. The latitude and longitude of those points would then be needed to determine the equation of the great circle track that joins them.

Figure 4:
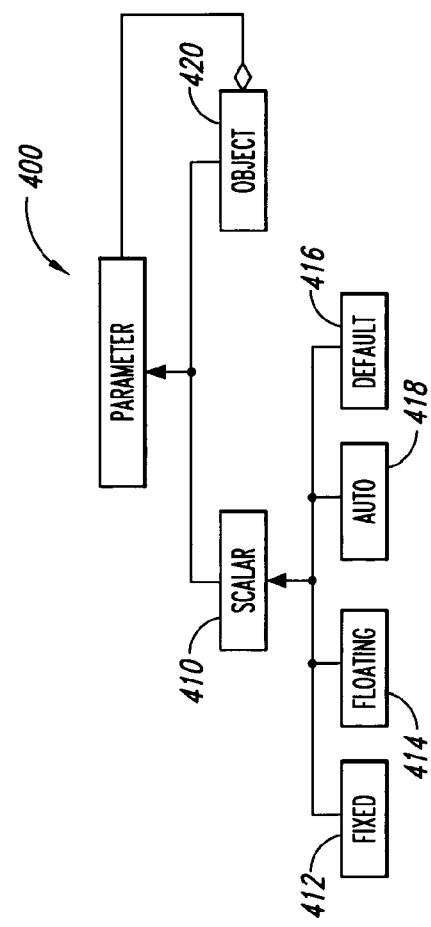
FIG. 4 is a diagram showing the different types of instruction parameters.

Two main types of parameters distinguished: scalar parameters 410 and object parameters 420. The former can be divided in turn into fixed 412, floating 414, default 416 and auto 418. Scalar parameters are intended to provide numerical information that can be either self-contained (fixed), or by means of an indication as to how the trajectory computation infrastructure is to retrieve it (floating, auto and default). A schematic classification of the parameters is depicted in FIG. 4.

The value of a fixed parameter is defined explicitly in the aircraft intent formulation. For instance, a change in the aircraft's bank to achieve a value of 15° would be modelled as a set bank angle instruction whose target parameter included in its effect has a value of 15°.

The value of a floating parameter is defined as the result of an algebraic equation involving state and/or control variables. For example, the turn radius needed to define fully the effect of a track horizontal path instruction describing the tracking of a circular arc would be defined as a function of the speed, path angle and bank angle of the aircraft at the start of the turn (the radius of curvature at the start of the turn is to be kept throughout the turn).

An auto parameter is a mechanism offered by the language to express the fact that the trajectory computation infrastructure is considered responsible for defining the value of a parameter as part of the trajectory computation process. For instance, a turn with constant bank angle to intercept a VOR radial could be modelled as a sequence set bank angle-hold bank angle where the target bank angle is an auto parameter. In this case, the trajectory computation infrastructure would be responsible for finding the value of bank angle that results in the capture of the radial.

The value of a default parameter is provided by the aircraft performance model during the trajectory computation process. The aircraft performance model contains default values for certain aircraft performance characteristics. For instance, a change in the aircraft's course could be modelled as a set bank angle instruction whose parameter is set to default. Assuming that it includes bank angle values for particular course changes, the aircraft performance model would provide the value of the target bank angle in response to a request from the trajectory computation engine.

Object parameters 420 are complex parameters that in turn may contain scalars for their definition. For example, a great circle defining the effect of a track horizontal path instruction may be considered an object parameter, with the coordinates of the points defining the great circle (see example above) being scalar parameters necessary to define fully the object.

Optimisation Criteria

The aircraft intent description language 200 contains the necessary mechanisms to describe aircraft intent defining optimal trajectories. Put another way, the language allows formulating instances of aircraft intent such that, when input to a suitable trajectory computation infrastructure, the resulting computed trajectory would be the result of solving a trajectory optimisation problem defined by the aircraft intent. In this context, the computed trajectory would be the one that optimises a certain predefined criterion. Optimisation criteria are mechanisms included in the language to capture a goal to be attained as the result of the aircraft's motion.

An optimisation criterion can be local (if it is to be attained at all times during the execution interval, e.g. hold the instantaneous maximum rate of climb), or global (if it is to be attained as the result of the aircraft motion during a certain execution interval, e.g. fly the Mach strategy that results in maximum range for given fuel load or minimum fuel consumption for a given flight distance). Examples of global optimisation criteria are: distance (maximum or minimum), time (maximum or minimum), minimum fuel and minimum cost. Examples of local optimisation criteria are minimum turn radius, maximum rate of climb, maximum path angle, etc.

Optimisation criteria are defined not to be instructions since they do not close a degree of freedom of the aircraft's motion; they are used as a mechanism to formulate trajectory optimisation problems by means of aircraft intent.

Optimisation criteria can be attached to certain instructions or to their own optimisation intervals. The optimisation interval is the time interval during which the aircraft motion must be optimised using the criterion. When it is associated to an instruction, the optimisation interval coincides with the execution interval defined for that instruction.

The instructions that can be associated to an optimisation criterion are: HLL, SBL, SL, HSL, VSL, PAL, AL, TVP, TL, BAL, CL and THP. An optimisation criterion only influences the aircraft motion when the effects of these instructions or the values of certain parameters associated to them are left unspecified for the optimisation interval. In such cases, the TCI will define the effect of those instructions (or the value of the parameters) as a result of a trajectory optimisation process.

The result of computing the trajectory corresponding to an instance of aircraft intent containing optimisation criteria is unique, as it is assumed to correspond to the global minimum of a constrained optimisation problem.

Contemplated Applications

The present invention may find utility on any application that requires prediction of an aircraft's trajectory, and where the information required to generate the aircraft intent is available (either at the time or, when aircraft intent is to be expressed in aircraft intent description language, also later when the trajectory computation is actually performed).

For example, the trajectory computation infrastructure 100 may be provided as part of a flight management system 220 of an aircraft 222. The flight management system may make use of the trajectory prediction facility when determining how the aircraft is to be flown. For example, the flight management system may adopt an iterative approach to flight planning. A trajectory may be predicted and compared to objectives such as the airline's business objectives (minimum flight time, minimum fuel burn, etc.). The details of the flight plan may be adjusted and the result the predicted trajectory determined and compared to the objectives.

A trajectory predicted as described in the preceding paragraph may be provided to air traffic management 224, akin to the provision of a detailed flight plan. The present invention has particular utility where the aircraft and air traffic management systems are not compatible. Using the present invention, the aircraft intent expressed in the aircraft intent description language may be passed from aircraft to air traffic management. Air traffic management may then use this aircraft intent to predict the aircraft's trajectory using its own system 226.

For an air-based trajectory computation infrastructure, the flight management system may have access to some of the information required to generate the aircraft intent. For example, airline preferences may be stored locally for retrieval and use. Moreover, the aircraft performance model and Earth model may be stored locally and updated as necessary. Further information will be input by the pilot, for example the particular SID, navigation route and STAR to be followed, as well as other preferences like when to deploy landing gear, change flap settings, engine ratings, etc. Some missing information may be assumed, e.g. flap and landing gear deployment times based on recommended airspeed.

All this required information may be acquired before a flight, such that the trajectory of the whole flight may be predicted. Alternatively, only some of the information may be acquired before the flight and the rest of the information may be acquired en route. This information may be acquired (or updated, if necessary) following a pilot input, for example in response to a change in engine rating or flight level. The trajectory computation infrastructure may also update the predicted trajectory, and hence the aircraft intent as expressed in the aircraft intent description language, due to changes in the prevailing atmospheric conditions, as updated through the Earth model. Updates may be communicated via any of the types of well-known communication link 230 between the aircraft and the ground: the latest atmospheric conditions may be sent to the aircraft and the revised aircraft intent of predicted trajectory may be sent from the aircraft.

Air traffic management applications will be similar to the above described air-based system. Air traffic management may have information necessary to determine aircraft intent, such as flight procedures (SIDs, STARs, etc.), information relating to aircraft performance (as an aircraft performance model), atmospheric conditions (as an Earth model), and possibly even airline preferences. Some information, such as pilot preferences relating to for example when to change the aircraft configuration, may be collected in advance of a flight or during a flight. Where information is not available, air traffic management may make assumptions in order for the aircraft intent to be generated and the trajectory to be predicted. For example, an assumption may be made that all pilots will deploy their landing gear ten nautical miles from a runway threshold or at a particular airspeed.

In an embodiment of a computer-implemented method of air traffic management, the predicted trajectory of one or more aircraft 240 may be compared to identify potential conflicts. Any potential conflicts may be resolved by advising one or more of the aircraft of necessary chancres to their aircraft intent.

In another embodiment, a method of avoiding aircraft collisions may comprise receiving a set of instructions expressed in a formal language that relate to the aircraft intent of another aircraft, predicting the trajectory of the other aircraft, and comparing the two predicted trajectories to identify any conflicts in the trajectories.

Example of a Standard Instrument Departure

Figure 5:
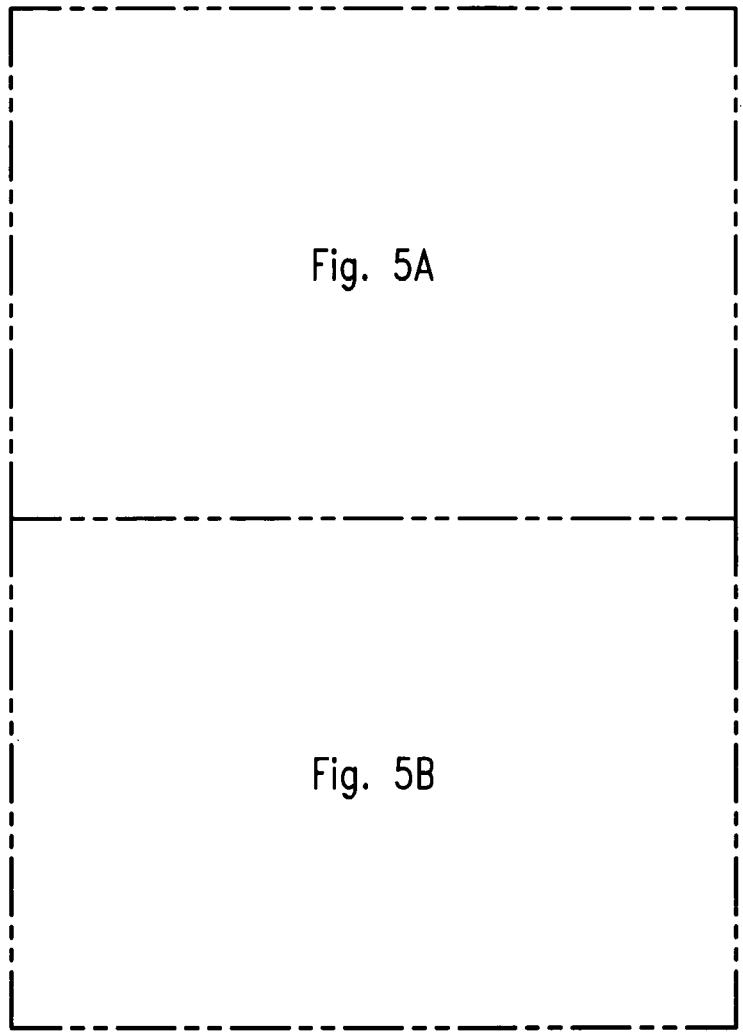
FIG. 5 shows a relationship between FIG. 5A and FIG. 5B.
Figure 5A:
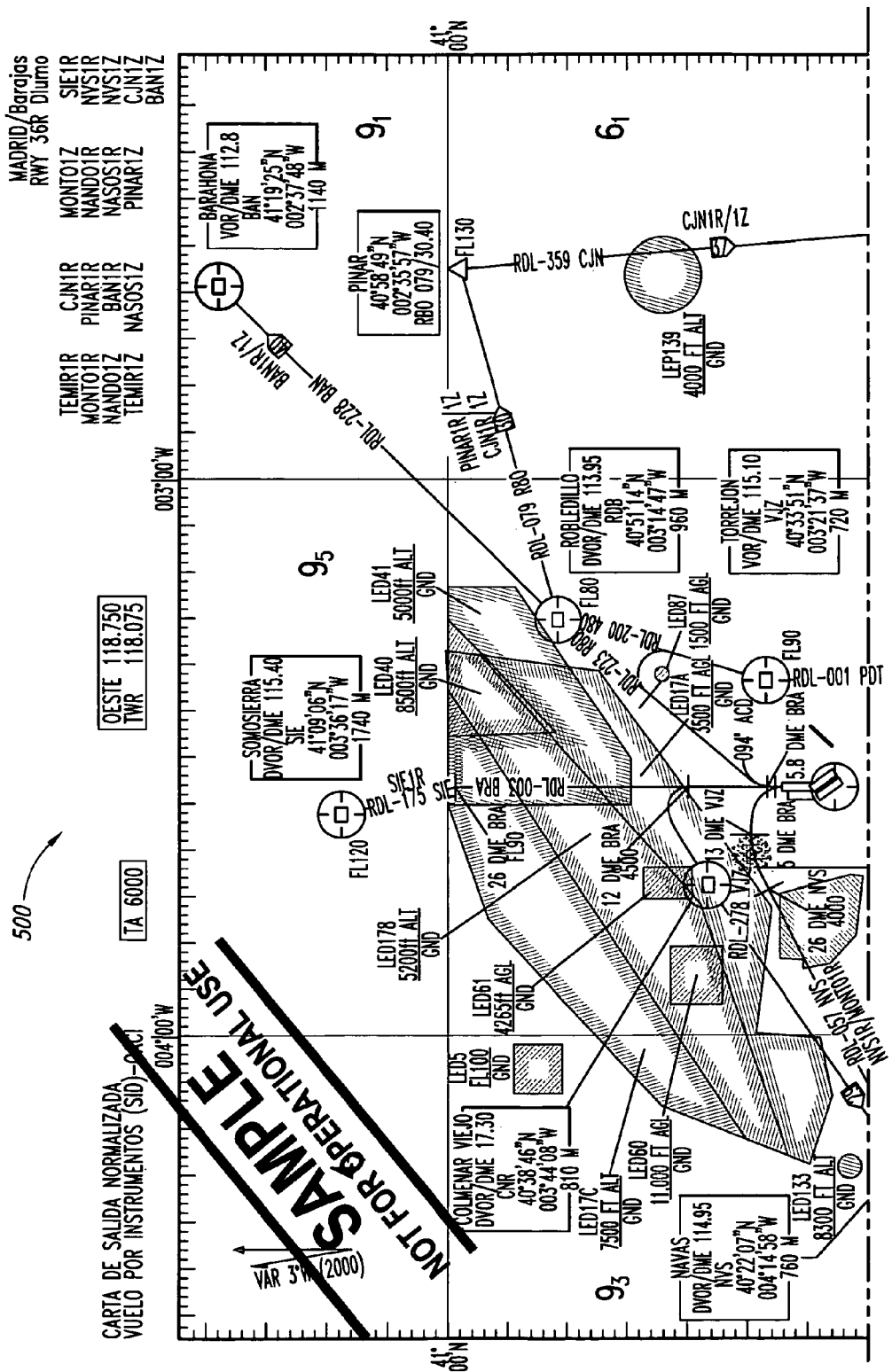
FIG. 5A is a navigation chart showing standard instrument departures (SIDs) from Madrid Barajas airport.
Figure 5B:
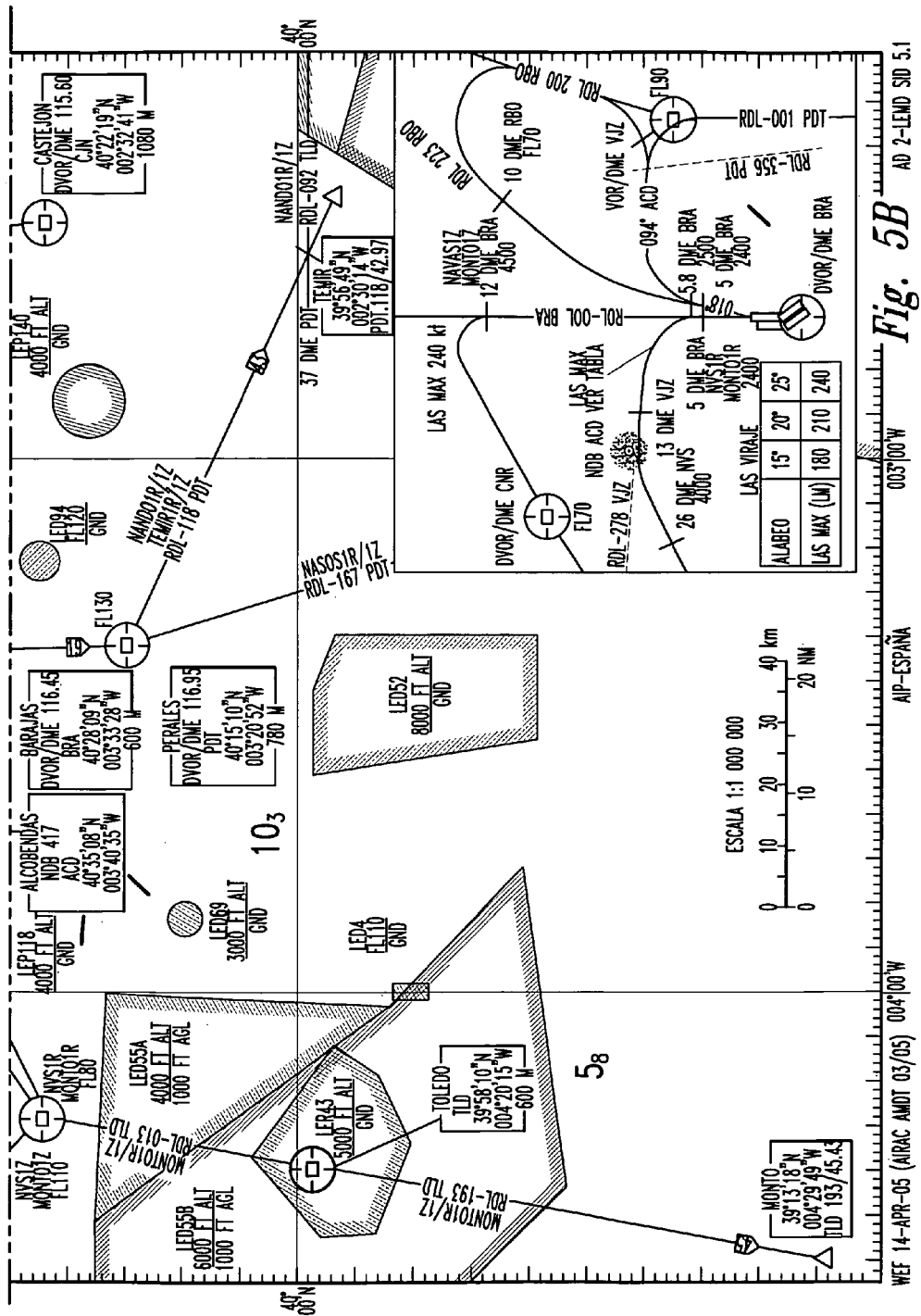
FIG. 5B is a navigation chart showing standard instrument departures (SIDs) from Madrid Barajas airport.
Figure 6A:
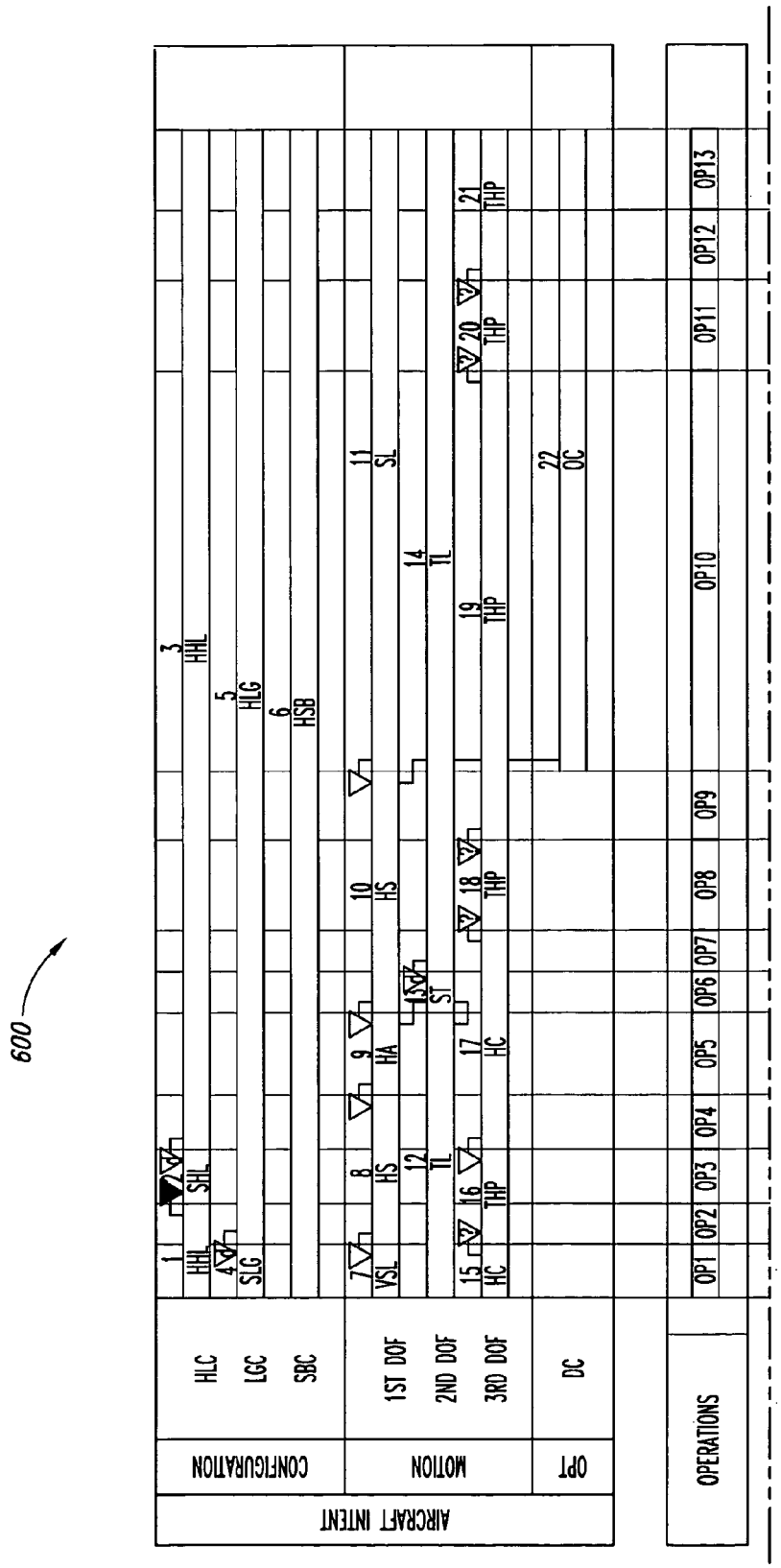
FIG. 6A is a diagram showing an example of aircraft intent for one of the SIDs shown in FIGS. 5A and 5B.
Figure 6B:
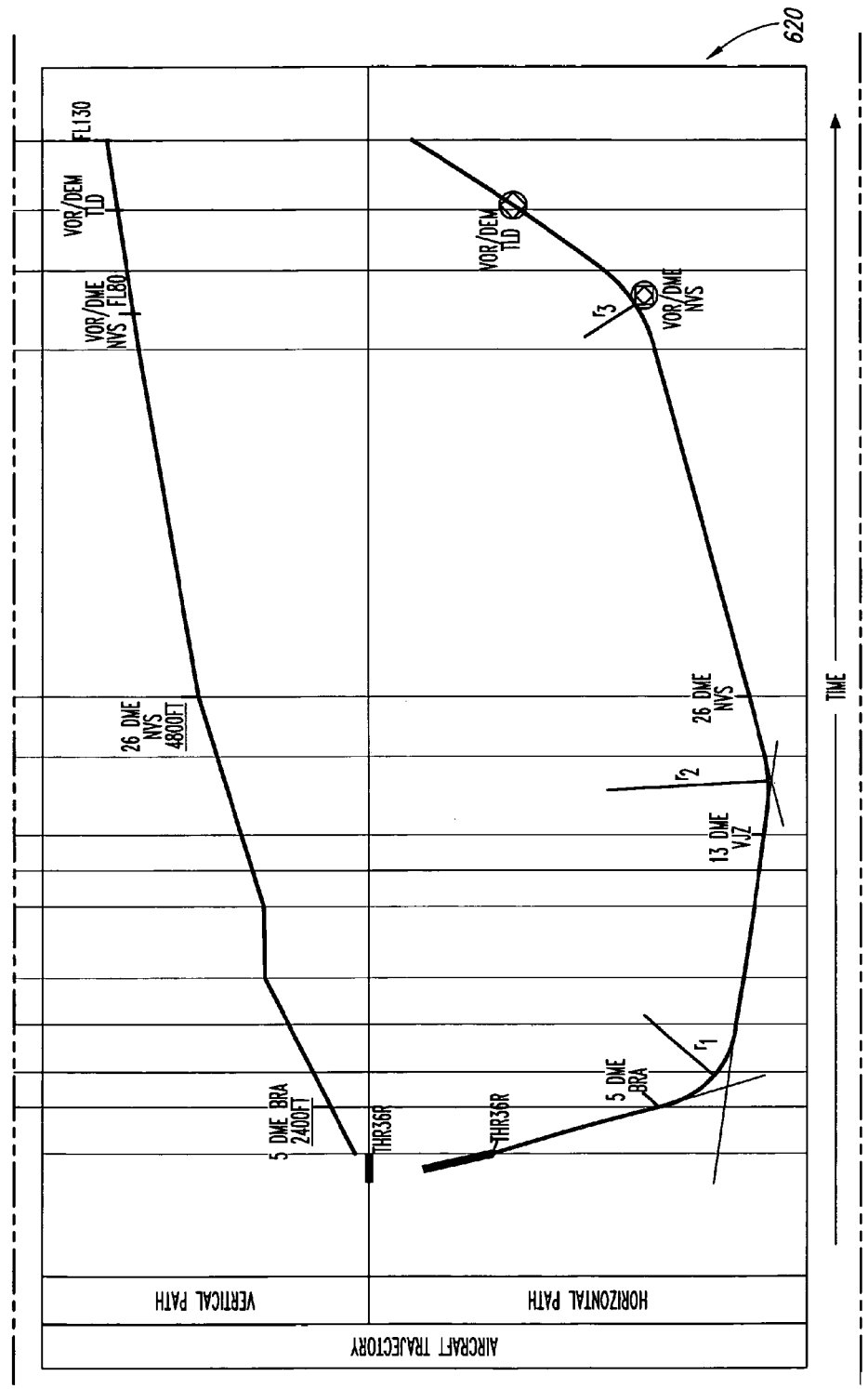
FIG. 6B is a diagram showing an example of a computer trajectory for one of the SIDs shown in FIGS. 5A and 5B.

To provide a specific illustration of how the invention may be used, an example of a SID flown from Madrid Barajas airport is presented. FIG. 5 shows a relationship between FIG. 5A and FIG. 5B. Thus, FIG. 5 presents FIG. 5A and FIG. 5B, as shown in FIG. 5. FIGS. 5A and 5B reproduce a navigational chart 500 of the area around the airport. FIG. 5A is a navigation chart showing standard instrument departures (SIDs) from Madrid Barajas airport. FIG. 5B is a navigation chart showing standard instrument departures (SIDs) from Madrid Barajas airport. FIG. 6 shows a relationship between FIGS. 6A, 6B, and 6C. Thus, FIG. 6 presents FIG. 6A, FIG. 6B, and FIG. 6C, as shown in FIG. 6. FIGS. 6A, 6B, and 6C show the aircraft intent 600 generated for the SID (including the lengths of each of the operations) and a sketch of the trajectory 620 generated from this intent. FIG. 6A is a diagram showing an example of aircraft intent for one of the SIDs shown in FIGS. 5A and 5B. FIG. 6B is a diagram showing an example of a computer trajectory for one of the SIDs shown in FIGS. 5A and 5B. FIG. 6C is a diagram showing an example of aircraft intent for one of the SIDs shown in FIGS. 5A and 5B.

The take-off runway has been selected as 36R and the SID to be followed is the standardised departure to MONTO1R. This departure can be seen in FIG. 5 as the route that follows the first left turn indicated after take-off and continues to the lower left of the figure. The aeronautical information publication (AIP) defines this SID as:

"Climb and maintain runway heading until reaching 5 DME BRA at 2400 ft or above. Initiate a left turn to continue on RDL-278 VJZ direct to 13 DME VJZ. Initiate a left turn to continue on RDL-067 NVS direct to 26 DME NVS at 4000 ft or above. Continue to DVOR/DME NVS at FL80 or above. Initiate a left turn to continue on RDL-013 TLD direct to VOR/DME TLD. Continue on RDL-193 TLD direct to MONTO.

Minimum climb inclination of 6% until reaching 2400 ft. Maintain FL130 and request flight level change en-route."

The above description can be considered as the flight intent for the SID, as it outlines the operational strategy required by air traffic management to fly according to the SID, including the associated constraints. However, this description does not provide a unique, unambiguous trajectory. Instead, it allows the operator to fill in the gaps and define a specific trajectory that fulfils its objectives (e.g. minimize the operating cost) while complying with the requirements of the SID (the flight intent). Thus, to derive the aircraft intent, further information about the operator's objectives and even pilot preferences must be collected.

The necessary information could be collected by air traffic management prior to the aircraft's departure, in a manner analogous to the current collection of flight plans. For instance, a pilot may plan a flight taking into account destination, departure runway and prevailing atmospheric conditions. The pilot will specify the route to be followed, how that route is to be flown, and the configuration of the aircraft through the flight. This information may be used by trajectory computation infrastructure, either within the aircraft or at a crew facility provided at the airport or elsewhere, to derive the aircraft intent and, optionally, to provide an aircraft trajectory.

The aircraft intent may then be released to air traffic management such that they too can predict the aircraft's trajectory. This information may be used to coordinate aircraft departures from the airport, i.e. the exact sequence of aircraft taking off and the necessary separation between successive aircraft. The aircraft intent may also be supplied to air traffic management responsible for the destination airport who may use the information to plan arrival of aircraft.

The present invention provides a framework to define an aircraft intent that complies with a given flight intent and expresses it in a common format. The process of obtaining aircraft intent from flight intent is referred to as the aircraft intent generation process. This process consists of using input information, like that described above, to select an adequate set of instructions from the aircraft intent description language so that the result, once processed by a trajectory computation infrastructure, is a unique trajectory that complies with the original flight intent. This trajectory 620 may be a graphical display similar to that shown, for example, in FIG. 6.

By means of an aircraft intent generation process based on the aircraft intent description language, the SID introduced above can give rise to, for example, the aircraft intent description shown in FIG. 6. This aircraft intent could be input to a trajectory computation infrastructure to compute the resulting trajectory, which would comply with the SID. The trajectory computation infrastructure may be capable of processing aircraft intent as originally expressed in the aircraft intent description language, or a translation into a proprietary trajectory computation infrastructure format may be required prior to computation. The process of generating the aircraft intent in FIG. 6 from the SID, airline preference and pilot inputs is explained below. The intent generation process sees this information used to select the instructions active at any one time that unambiguously describe aircraft intent. The information collected will determine each of the instructions selected. For example, the aircraft will always have its configuration defined, leading to the selection of the configuration instructions. How the aircraft is being commanded to fly will determine the motion instructions selected: commands to track bearing and hold altitude will determine the three motion instructions. This is explained in further detail below.

The upper part of FIG. 6 shows the instructions that are active at any time and how their overlapping execution intervals define the length of each operation (see the central part of FIG. 6).

The three configuration instructions are shown at the top of FIG. 6, with the three motion instructions required to close the three degrees of freedom of the equations of motion beneath, and finally the optimisation criterion at the bottom.

In FIG. 6, the HLC profile contains the instructions defining the high lift devices configuration (position of the flaps). To determine the instructions in this profile, the following process is followed. Initially, the aircraft is in a configuration with landing gear deployed and flaps extended, but otherwise clean. This state is maintained until the time the pilot has indicated for flap retraction. This is modelled by a HHL instruction that remains active until retraction commences, when at is superseded by a SHL instruction (see FIG. 2B for instruction codes). As indicated in FIG. 6, this change of instruction is initiated by a fixed trigger (the symbols indicated in FIG. 3 are used to denote the trigger types). The associated time value corresponds to the instant the pilot has selected for flap retraction. The SHL instruction ends once the flaps are retracted to their clean configuration. The time when this event takes place (a default end trigger) marks the beginning of another HHL instruction, which indicates that the flaps remain retracted for the remainder of the procedure. The time value characterizing this default trigger could be obtained from the aircraft performance model (assumed to include data on flap retraction times).

LGC is the landing gear configuration profile, which contains the instructions defining the evolution of the landing gear configuration. The pilot that the landing gear are to be retracted at the initial time (upon take-off). This is modelled with a SLG instruction that starts at that initial time. A default end trigger is set for this instruction, which indicates that the instruction ends when the landing gear is fully retracted. The time value characterising this default trigger could be obtained from the aircraft performance model (assumed to include data on landing gear retraction times). The landing gear is to remain retracted for the remainder of the procedure. This is modelled with a HLG instruction.

SBC is the speed brakes configuration profile, which contains the instructions defining the evolution of the speed brakes configuration. The pilot does not use the speed brakes during this procedure, and this is modelled with a HSB instruction (the initial state is speed brakes on), which is active throughout the procedure.

In this example, the sequence of instructions used to close one of the degree of freedom of the aircraft motion (labelled $1^{st}$ DOF in FIG. 6) defines the evolution of the speed and altitude of the aircraft. This sequence is generated as follows:

1. The pilot chooses to fly aircraft at maximum vertical speed until reaching an altitude of 2400 ft. This is modelled using a VSL instruction with an effect given by the maximum vertical speed law provided by the aircraft performance model and with a floating end trigger at 2400 ft. The vertical speed value can be captured from the aircraft's systems or from the pilot input, or can be estimated.
2. Upon reaching 2400 ft, the pilot chooses to maintain the current CAS until reaching an altitude of 3500 ft. This is modelled using a HS instruction with a floating end trigger at 3500 ft. This value can be captured from the aircraft's systems or pilot input, or can be estimated.
3. Upon reaching 3500 ft, the pilot decides to maintain altitude, accelerating until an airspeed of 240 KCAS (knots—calibrated airspeed) is reached. This is modelled using a HA instruction with a floating end trigger at 240 KCAS. This value can be captured from the aircraft's systems or pilot input, or can be estimated.
4. Upon reaching a speed of 240 KCAS, the pilot chooses to continue the climb at constant calibrated airspeed until reaching an altitude of 4800 ft. This is modelled using a HS instruction with a floating end trigger at 4800 ft. This value can be captured from the aircraft's systems or pilot input, or can be estimated.
5. Upon reaching 4800 ft, the pilot chooses to continue the climb following a cost-optimal airspeed law until reaching flight level FL130. This is modelled with a SL instruction associated to an optimisation criterion of minimum cost with a floating end trigger at FL130. The effect of this instruction is to be calculated by the trajectory computation infrastructure based on a model of the aircraft's flight management system logic and the value of the cost index applied for the flight (this value could be extracted from the flight management system). The value of the end trigger can be captured from the aircraft's systems or pilot input, or can be estimated.

The sequence of instructions used to close a second degree of freedom of the aircraft motion (labelled $2^{nd}$ DOF in FIG. 6) defines the evolution of the throttle control. This sequence is generated as follows:

1. The pilot decides to take-off at maximum take-off regime and to maintain that regime until reaching an airspeed value of 240 KCAS. This is modelled using a TL instruction whose effect is given by the aircraft performance model (maximum take-off regime model for the aircraft type at hand) and with a floating and trigger at 240 KCAS. This value can be captured from the aircraft's systems or pilot input, or can be estimated.
2. Upon reaching airspeed of 240 KCAS, the pilot indicates a change to the throttle setting to maximum climb regime. To model the transition between the two regimes, ST instruction is used. The effect of this instruction is given by the aircraft performance model (model of engine regime transitions) and its end trigger is a default one. The time associated with this trigger is also provided by the model of engine regime transition in the APM.
3. The pilot indicated that the maximum climb regime is to be maintained until reaching FL130. This is modelled with a TL instruction following the ST instruction. The effect of this TL instruction is given by the aircraft performance model (maximum climb regime model for the aircraft type at hand) and its end trigger (floating) that has an associated value of FL130.

The sequence of instructions used to close the third degree of freedom of the aircraft motion (labelled $3^{rd}$ DOF in FIG. 6) defines the lateral path to be followed by the aircraft. This sequence is generated as follows:

1. The procedure is followed with the LNAV (Lateral Navigation) function of the aircraft's flight management system engaged from take-off. The pilot decides to hold the initial bearing (given by the orientation of runway RDL-003 BRA) until the initiation of the turning manoeuvre required to intersect the radial RDL-278 VJZ. This is modelled using a HC instruction with an auto end trigger to specify that the point of turn initiation is to be calculated by the trajectory computation infrastructure on the basis of a model of the flight management system lateral guidance (included in the aircraft performance model).
2. The turn to radial RDL-278 VJZ, which will be flown at a constant radius calculated by the LNAV function, ends when the aircraft's bearing coincides with the orientation of the radial. The turn is modelled using a THP instruction whose effect is a circular arc with radius calculated by the trajectory computation infrastructure according to the model of the flight management system guidance in place. The end trigger of this instruction is a floating trigger characterized by the orientation of the radial to be captured.
3. Once the radial has been captured, the aircraft will maintain the bearing until the initiation of the turning manoeuvre required to intersect the radial RDL-067 NVS. This is modelled using a HC instruction with an auto end trigger to specify that the point of turn initiation is to be calculated by the trajectory computation infrastructure on the basis of a model of the flight management system lateral guidance (included in the aircraft performance model).
4. The turn to radial RDL-067 NVS, which will be flown at a constant radius calculated by the LNAV function, ends when the aircraft is on the track from VOR DME NVS defined by the radial and with a bearing coinciding with the orientation of the radial. The turn is modelled using a THP instruction whose effect is a circular arc with radius calculated by the trajectory computation infrastructure according to the model of the flight management system guidance in place. The end trigger this case is of type auto to indicate that the trajectory computation infrastructure is to calculate the time and location of the end of the turn manoeuvre taking into account the flight management system guidance model and the fact that the turns end on the aforementioned track.

5. Once the track defined by the VOR radial has been captured, the aircraft will fly that track until the initiation of the turning manoeuvre required to intersect the great circle track defined by the VORs NVS and TLD. This is modelled using a THP instruction whose effect is the aforementioned VOR radial track with an auto end trigger to specify that the point of turn initiation is to be calculated by the trajectory computation infrastructure on the basis of a model of the flight management system lateral guidance (included in the aircraft performance model).

6. The turn to the great circle defined by the VORs NVS and TLD, which is also flown at a constant radius calculated by the LNAV function, ends when the aircraft is on the great circle. The turn is modelled using a THP instruction whose effect is a circular arc with radius calculated by the trajectory computation infrastructure according to the model of the flight management system guidance in place. The end trigger is of type auto to indicate that the trajectory computation infrastructure is to calculate the time and location of the end of the turn manoeuvre taking into account the flight management system guidance model and the fact that the turns end on the aforementioned great circle.

7. Once the great circle has been captured, the aircraft will fly that great circle until the end of the procedure. This is modelled using a THP instruction whose effect is the aforementioned great circle.

The above reflects the aircraft intent description that is generated for this departure. This description may be used by a trajectory computation engine to predict the aircraft's trajectory. This is performed in conjunction with an aircraft performance model that is representative of the actual aircraft flying the SID, and also in conjunction with the Earth model that will provide information on the prevailing atmospheric conditions at time of departure. The lower part of FIG. 6 graphically shows a trajectory 620 that corresponds to a trajectory description provided by the trajectory computation engine. The vertical path is shown above the horizontal path: both are shown as a function of time (as denoted by the abscissa) to illustrate the utility of the present invention. Specifically, the horizontal and vertical position of the aircraft is defined at successive instances during the departure procedure and hence the trajectory of the aircraft may be plotted.

The person skilled in the art will appreciate that variations may be made to the above described embodiments without departing from the scope of the invention defined by the appended claims.

The invention claimed is:

1. A method of predicting a trajectory of an aircraft, comprising:
    receiving, at a processor, information defining how the aircraft is to be flown during an operation interval, and storing the information in an information database;
    deriving, by the processor, a set of instructions from the information stored, wherein the set of instructions comprise configuration instructions that describe an aerodynamic configuration of the aircraft and motion instructions that describe an aircraft motion;
    requiring, by the processor, an operation that at least six instructions to be active simultaneously throughout the operation interval, wherein the at least six instructions are chosen from at least three groups selected from motion instructions and at least one group selected from configuration instructions; and
    confirming, by the processor, that the set of instructions comply with a set of rules stored in a rules database, that the configuration instructions define the aerodynamic configuration of the aircraft and that the motion instructions close degrees of freedom of equations of motion used to describe the aircraft motion during the time interval; and
    operating the aircraft according to the instructions.

2. The method of claim 1, wherein deriving the set of instructions comprises identifying from the information stored information relating to how the aircraft is to be configured and providing configuration instructions based on that configuration-related information.

3. The method of claim 2, comprising identifying information relating to high-lift devices, landing gear or speed brakes, and providing a high-lift related, landing gear related or speed brakes related instruction, respectively.

4. The method of claim 3, wherein confirming comprises ensuring that the set of instructions includes one and only one of each of a high-lift related instruction, a landing gear related instruction and a speed brakes related instruction.

5. The method of claim 1, wherein deriving the set of instructions comprises identifying from the information stored information determining the motion of the aircraft and providing motion instructions based on that motion-related information.

6. The method of claim 5, comprising identifying information relating to lateral motion, vertical motion and speed, and providing motion instructions that determine the lateral motion, vertical motion and speed.

7. The method of claim 6, wherein confirming comprises ensuring that there are three motion instructions, each motion instruction closing one degree of freedom.

8. The method of claim 1, wherein confirming comprises ensuring that the instructions do not provide conflicting requirements.

9. The method of claim 1, wherein instructions are placed into groups, such that instructions are first distributed according to their effect and then incompatible instructions are grouped together.

10. The method of claim 9, comprising deriving the set of instructions such that the set only contains one instruction from each group.

11. The method of claim 1, wherein receiving information comprises receiving information relating to aircraft operator preferences, how a pilot intends to fly the aircraft, or departure/arrival procedures to be followed during a flight.

12. The method of claim 1, further comprising:
    expressing the set of instructions using a formal language by providing either necessary information or references to where the necessary information may be found, to solve equations of motion describing aircraft flight and so compute the trajectory of the aircraft.

13. The method of claim 12, wherein providing references to where the information may be found comprises providing references to a database storing information relating to the aircraft performance or atmospheric conditions.

14. The method of claim 1, comprising providing a graphical display of the set of instructions expressed using the formal language.

15. A method of predicting a trajectory of an aircraft, the method comprising:
    reading, by a processor, data providing a description of aircraft intent, the data provided:

receiving information defining how the aircraft is to be flown during an operation interval, and storing the information in an information database;

deriving a set of instructions from the information stored, wherein the set of instructions comprise configuration instructions that describe an aerodynamic configuration of the aircraft and motion instructions that describe an aircraft motion;

requiring, by the processor, an operation that at least six instructions to be active simultaneously throughout the operation interval, wherein the at least six instructions are chosen from at least three groups selected from motion instructions and at least one group selected from configuration instructions;

confirming, by the processor, that the set of instructions comply with a set of rules stored in a rules database, that the configuration instructions define the aerodynamic configuration of the aircraft and that the motion instructions close degrees of freedom of equations of motion used to describe the aircraft motion during the operation interval; and expressing the set of instructions;

solving, by the processor, equations of motion defining aircraft motion using the data and with reference to an aircraft performance model and an Earth model, whereby solved equations of motion are produced; and operating the aircraft using at least the predicted trajectory and the solved equations of motion.

16. The method of claim 15, comprising displaying predicted trajectory.

17. A method of air traffic management, the method comprising:

predicting, by a processor, the trajectories of at least two aircraft, comprising for each prediction:

reading data providing a description of aircraft intent, the data provided by:

receiving information defining how the aircraft is to be flown during an operation interval, and storing the information in an information database;

deriving a set of instructions from the information stored, wherein the set of instructions comprise configuration instructions that describe an aerodynamic configuration of the aircraft and motion instructions that describe an aircraft motion;

requiring, by the processor, an operation that at least six instructions to be active simultaneously throughout the operation interval, wherein the at least six instructions are chosen from at least three groups selected from motion instructions and at least one group selected from configuration instructions;

confirming, by the processor, that the set of instructions comply with a set of rules stored in a rules database, that the configuration instructions define the aerodynamic configuration of the aircraft and that the motion instructions close degrees of freedom of equations of motion used to describe the aircraft motion during the operation interval; and expressing the set of instructions;

solving, by the processor, equations of motion defining aircraft motion using the data and with reference to an aircraft performance model and an Earth model;

comparing, by the processor, the at least two predicted trajectories to identify potential conflicts; and managing, by the processor, the air traffic, including the at least two aircraft, using the at least two predicted trajectories.

18. The method of claim 17, further comprising resolving conflicts by advising aircraft of necessary changes to their aircraft intent.

19. A method of avoiding aircraft collisions, comprising:

an aircraft predicting a trajectory of the aircraft, comprising:

reading, by a processor on the aircraft, data providing a description of aircraft intent, the data provided by:

receiving information defining how the aircraft is to be flown during an operation interval, and storing the information in an information database;

deriving a set of instructions from the information stored, wherein the set of instructions comprise configuration instructions that describe an aerodynamic configuration of the aircraft and motion instructions that describe an aircraft motion;

requiring, by the processor, an operation that at least six instructions to be active simultaneously throughout the operation interval, wherein the at least six instructions are chosen from at least three groups selected from motion instructions and at least one group selected from configuration instructions;

confirming, by the processor ensuring that the set of instructions comply with a set of rules stored in a rules database, that the configuration instructions define the aerodynamic configuration of the aircraft and that the motion instructions close degrees of freedom of equations of motion used to describe the aircraft motion during the operation interval; and expressing the set of instructions;

solving equations of motion defining aircraft motion using said data and with reference to an aircraft performance model and an Earth model; and predicting the trajectory of the aircraft to form a predicted trajectory of the aircraft;

receiving, by the processor, a set of instructions that relate to an aircraft intent of another aircraft;

predicting, by the processor, a trajectory of the another aircraft;

comparing, by the processor, the two predicted trajectories to identify any conflicts in the two predicted trajectories between the aircraft and the another aircraft, wherein an identified conflict is formed; and avoiding, by the processor, aircraft collisions based on the identified conflict in the two predicted trajectories between the aircraft and the another aircraft.

20. The method of claim 19, comprising providing a graphical display of the predicted trajectories on a graphical display connected to the processor and on the aircraft.

* * * * *